US011504785B2

(12) United States Patent
Yamaoka et al.

(10) Patent No.: US 11,504,785 B2
(45) Date of Patent: Nov. 22, 2022

(54) WIRE ELECTRICAL DISCHARGE MACHINE AND CONTROL METHOD

(71) Applicant: FANUC CORPORATION, Yamanashi (JP)

(72) Inventors: Masahide Yamaoka, Yamanashi-ken (JP); Kaoru Hiraga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 270 days.

(21) Appl. No.: 16/939,606

(22) Filed: Jul. 27, 2020

(65) Prior Publication Data

US 2021/0031287 A1 Feb. 4, 2021

(30) Foreign Application Priority Data

Jul. 31, 2019 (JP) .............................. JP2019-140461

(51) Int. Cl.
*B23H 7/20* (2006.01)
*B23H 1/10* (2006.01)
*B23H 7/30* (2006.01)

(52) U.S. Cl.
CPC ................ *B23H 7/20* (2013.01); *B23H 1/10* (2013.01); *B23H 7/30* (2013.01); *B23H 2600/10* (2013.01)

(58) Field of Classification Search
CPC ........ B23H 7/20; B23H 2600/10; B23H 7/02; B23H 7/10; B23H 7/101; B23H 7/06; B23H 7/065; G05B 2219/45043
See application file for complete search history.

(56) References Cited

U.S. PATENT DOCUMENTS

| 5,453,592 | A | 9/1995 | Takeuchi et al. |
| 9,085,037 | B2 * | 7/2015 | Yamaoka ............... B23H 7/065 |
| 2004/0172154 | A1 | 9/2004 | Maki |

FOREIGN PATENT DOCUMENTS

| EP | 1607161 A1 | 12/2005 |
| JP | 2000141133 A | 5/2000 |
| JP | 2004-74364 A | 3/2004 |

* cited by examiner

*Primary Examiner* — Geoffrey S Evans
(74) *Attorney, Agent, or Firm* — Robert P. Michal, Esq.; Carter, DeLuca & Farrel LLP (57) ABSTRACT

A wire electrical discharge machine controls a second motor unit including motors for feeding a wire electrode in a wire running direction in which the wire electrode extends, so as to feed the wire electrode at a set feed rate during a machining period from a first time point at which the wire electrode moving relative to a workpiece in a direction intersecting the wire running direction is estimated to enter the workpiece, to a second time point at which the wire electrode is estimated to exit the workpiece. The second motor unit is controlled so as to feed the wire electrode at a feed rate lower than the set feed rate during at least one of a first non-machining period from a processing start time point to the first time point and a second non-machining period from the second time point to a processing end time point.

10 Claims, 6 Drawing Sheets

WIRE ELECTRICAL DISCHARGE MACHINE AND CONTROL METHOD

CROSS-REFERENCE TO RELATED APPLICATION

This application is based upon and claims the benefit of priority from Japanese Patent Application No. 2019-140461 filed on Jul. 31, 2019, the contents of which are incorporated herein by reference.

BACKGROUND OF THE INVENTION

Field of the Invention

The present invention relates to a wire electrical discharge machine that generates electrical discharge by applying voltage at an electrode gap between a workpiece and a wire electrode to thereby machine the workpiece, and also relates to a control method of the wire electrical discharge machine.

Description of the Related Art

In a wire electrical discharge machine, a wire electrode is automatically fed to a location away from a workpiece (a machining target) and then machine processing is started from that point where the wire electrode has been automatically fed, as a processing start position. Japanese Laid-Open Patent Publication No. 2004-074364 discloses a wire electrical discharge machine which automatically feeds the wire electrode through a processing start hole that is away from the workpiece to be machined (machining shape), and thereafter starts processing of the workpiece (machining shape) in accordance with a programmed machining route.

SUMMARY OF THE INVENTION

The wire electrical discharge machine performs processing on a workpiece while feeding the wire electrode at a preset wire feed rate in a wire running direction in which the wire electrode extends, after the start of machine processing. That is, the wire electrode is continuously fed even during a non-machining period in which the wire electrode is moved from the processing start position to the workpiece. Therefore, the wire electrode fed during this non-machining period runs to waste, and the load of the motor to feed the wire electrode during this period is also wasted.

Further, since the processing end position is also located away from the workpiece, the wire electrode is also wasted during the non-machining period in which the wire electrode is moved from the machining end point on the workpiece to the processing end position, and also the load of the motor to feed the wire electrode during this period is also wasted.

It is therefore an object of the present invention to provide a wire electrical discharge machine and a control method thereof that enables efficient machining.

According to a first aspect of the invention, a wire electrical discharge machine for machining a workpiece by applying voltage to an electrode gap formed between the workpiece and a wire electrode to generate electrical discharge, includes: a motor configured to feed the wire electrode in a wire running direction in which the wire electrode extends; and, a motor control unit configured to control the motor. The motor control unit is configured to control the motor so as to feed the wire electrode at a set feed rate during a machining period from a first time point at which the wire electrode moving relative to the workpiece in the direction intersecting the wire running direction is estimated to enter the workpiece, to a second time point at which the wire electrode is estimated to exit the workpiece, and control the motor so as to feed the wire electrode at a feed rate lower than the set feed rate during at least one of a first non-machining period from a processing start time point to the first time point and a second non-machining period from the second time point to a processing end time point.

According to a second aspect of the invention, a control method of a wire electrical discharge machine that machines a workpiece by applying voltage to an electrode gap formed between the workpiece and a wire electrode to generate electrical discharge, includes: a first control step of controlling a motor configured to feed the wire electrode in a wire running direction in which the wire electrode extends, so as to feed the wire electrode at a set feed rate during a machining period from a first time point at which the wire electrode moving relative to the workpiece in the direction intersecting the wire running direction is estimated to enter the workpiece, to a second time point at which the wire electrode is estimated to exit the workpiece; and, a second control step of controlling the motor so as to feed the wire electrode at a feed rate lower than the set feed rate during at least one of a first non-machining period from a processing start time point to the first time point and a second non-machining period from the second time point to a processing end time point.

According to the aspects of the present invention, the feed amount of the wire electrode in the non-machining period is reduced, so that it is possible to reduce waste of the wire electrode, the load of the motor to feed the wire electrode, and the like, and resultantly achieve efficient machining.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
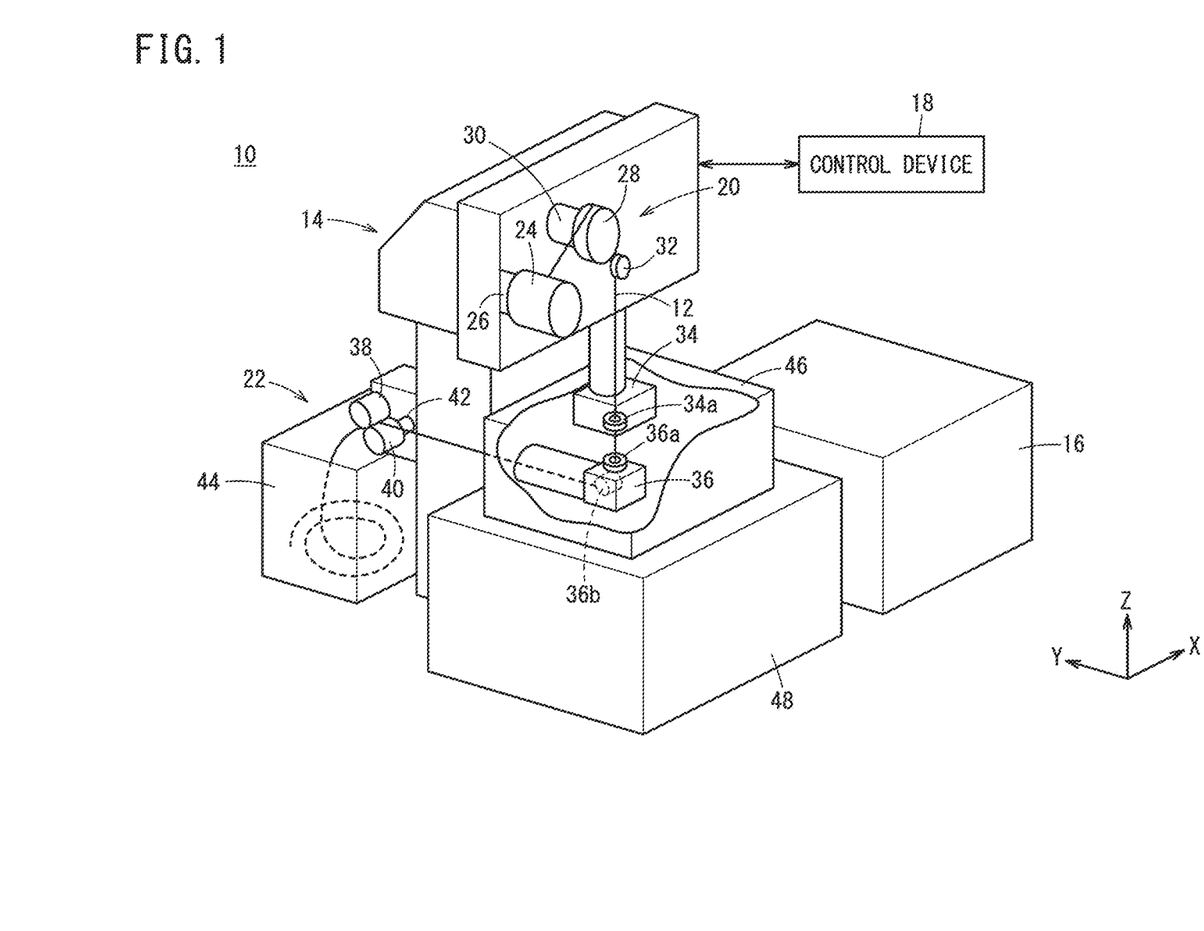
FIG. 1 is a schematic diagram showing a configuration of a wire electrical discharge machine of an embodiment.

The overall configuration of a wire electrical discharge machine 10 will be described with reference to FIG. 1. In FIG. 1, the X-axis direction, Y-axis direction, and Z-axis direction of the wire electrical discharge machine 10 are shown. Note that the X-axis direction and the Y-axis direction are orthogonal to each other on a plane, and the Z-axis direction is orthogonal to each of the X-axis direction and the Y-axis direction.

The wire electrical discharge machine 10 is a machine tool that generates electrical discharge at an electrode gap between the workpiece W (FIG. 2) and a wire electrode 12 in a dielectric working fluid by applying voltage to the electrode gap to thereby machine the workpiece W. The wire electrical discharge machine 10 includes a main machine body 14, a dielectric fluid unit 16, and a control device 18 for controlling the main machine body 14 and the dielectric fluid unit 16.

The wire electrode 12 is formed of, for example, metal material such as tungsten-based, copper alloy-based, or brass-based material. On the other hand, the workpiece W is formed of, for example, metal material such as iron-based material or superhard (tungsten carbide) material.

The main machine body 14 includes a supply system 20 that supplies the wire electrode 12 toward the workpiece W (workpiece, object to be machined), and a collecting system 22 that collects the wire electrode 12 that has passed through the workpiece W.

The supply system 20 includes a wire bobbin 24 on which a fresh wire electrode 12 is wound, a torque motor 26 that applies a torque to the wire bobbin 24, a brake shoe 28 for applying a braking force to the wire electrode 12 by friction, a brake motor 30 for applying a brake torque to the brake shoe 28, a tension detector 32 for detecting the magnitude of the tension of the wire electrode 12, and a die guide (upper die guide) 34 for guiding the wire electrode 12 at a position above the workpiece W.

The collecting system 22 includes a die guide (lower die guide) 36 for guiding the wire electrode 12 at a position below the workpiece W, a pinch roller 38 and a feed roller 40 capable of holding the wire electrode 12 therebetween, a torque motor 42 for applying a torque to the feed roller 40, and a collection box 44 for collecting the wire electrode 12 conveyed by the pinch roller 38 and the feed roller 40.

The main machine body 14 includes a work-pan 46 capable of storing a dielectric working fluid such as deionized water or oil used during machining. The work-pan 46 is mounted on a base 48. The die guides 34 and 36 are arranged in the work-pan 46, and the workpiece W is placed between the die guides 34 and 36. The die guides 34, 36, and the workpiece W are submerged in the working fluid stored in the work-pan 46.

The die guides 34 and 36 have respective support blocks 34a and 36a for supporting the wire electrode 12. The die guide 36 includes a guide roller 36b that changes the running direction of the wire electrode 12 and then guides the wire electrode 12 toward the pinch roller 38 and the feed roller 40.

The die guide 34 ejects a clean working fluid free from sludge (cutting chips) toward the electrode gap formed between the wire electrode 12 and the workpiece W. This makes it possible to fill the electrode gap with the clean fluid suitable for machining, and prevent a reduction in machining accuracy due to sludge generated during machining. The die guide 36 may also eject a clean working fluid free from sludge (cutting chips) toward the gap.

The dielectric fluid unit 16 is a device that removes sludge generated in the work-pan 46 and controls the liquid quality of the working fluid by adjusting electric resistivity, temperature and the like. The working fluid whose liquid quality is controlled by the dielectric fluid unit 16 is returned to the work-pan 46, and is ejected from at least the die guide 34.

Figure 2:
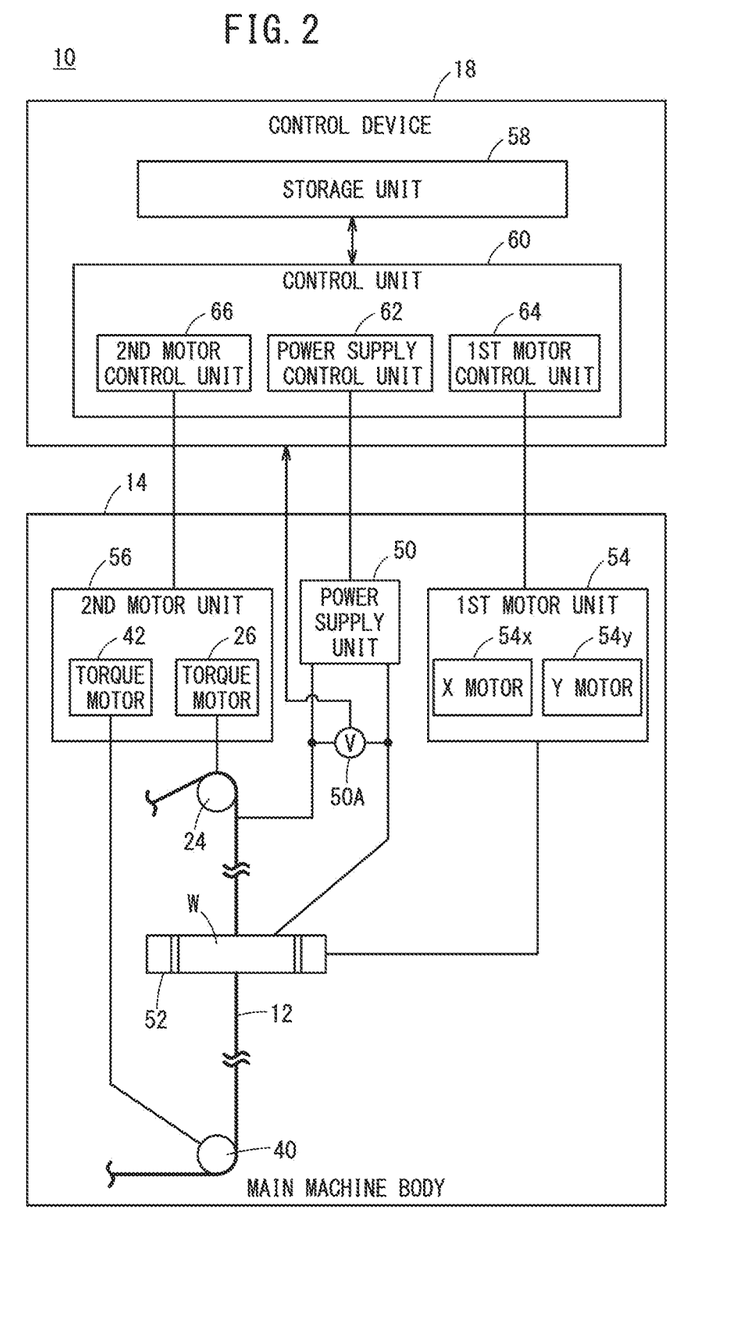
FIG. 2 is a schematic diagram showing a configuration of a machining control system of a wire electrical discharge machine.

Referring next to FIG. 2, the configuration of the machining control system of the wire electrical discharge machine 10 will be described. The main machine body 14 includes a power supply unit 50, a table 52, a first motor unit (motor) 54, and a second motor unit (motor) 56. On the other hand, the control device 18 includes a storage unit 58 and a control unit 60.

The power supply unit 50 applies voltage to the electrode gap between the workpiece W and the wire electrode 12. The power supply unit 50 repeatedly applies a temporary voltage (voltage pulse) to the electrode gap between the workpiece W and the wire electrode 12 at a predetermined cycle. A voltage sensor 50A is provided between the workpiece W and the wire electrode 12. The voltage sensor 50A detects the voltage applied to the electrode gap between the workpiece W and the wire electrode 12, and outputs the detected voltage to the control device 18. The voltage sensor 50A may be included in the power supply unit 50.

The table 52 is a table for fixing the workpiece W, and is arranged so as to be movable in the X-axis direction and the Y-axis direction. The workpiece W is fixed to the table 52 by a predetermined fixing jig. Therefore, the workpiece W moves integrally with the table 52.

The first motor unit 54 is a motor for creating relative movement between the wire electrode 12 and the workpiece W. In the present embodiment, the first motor unit 54 includes an X motor $54x$ for moving the wire electrode 12 in the X-axis direction relative to the workpiece W and a Y motor $54y$ for moving the wire electrode 12 in the Y-axis direction relative to the workpiece W.

The X motor $54x$ moves the table 52 in the X-axis direction to create relative movement of the wire electrode 12 to the workpiece W in the X-axis direction. The X motor $54x$ may move the die guides 34 and 36 in the X-axis direction to create relative movement of the wire electrode 12 to the workpiece W. The Y motor $54y$ moves the table 52 in the Y-axis direction to create relative movement of the wire electrode 12 to the workpiece W in the Y-axis direction. The Y motor $54y$ may move the die guides 34 and 36 in the Y-axis direction to create relative movement of the wire electrode 12 to the workpiece W.

The second motor unit 56 is a motor for feeding the wire electrode 12 in the wire running direction (Z-axis negative direction) in which the wire electrode 12 extends. The second motor unit 56 in the present embodiment includes the above-described torque motors 26 and 42. The wire running direction (Z-axis negative direction) of the wire electrode 12 and the moving direction (X-axis direction, Y-axis direction) of the wire electrode 12 moved relatively to the workpiece W have an intersecting relationship.

The storage unit 58 is a storage medium capable of storing various pieces of information. The storage unit 58 stores at least a machining program and machining conditions for machining the workpiece W. The machining conditions are set according to the setting operation of the operator through an input unit of the control device 18. When the operator does not perform setting operation, the machining conditions preset as default is stored in the storage unit 58. The machining conditions include the voltage value of the voltage (pulse voltage) applied to the electrode gap between the workpiece W and the wire electrode 12, the interval (pulse interval) of the voltage (pulse voltage) repeatedly applied to the electrode gap, the relative movement speed between the wire electrode 12 and the workpiece W, and the feed rate of the wire electrode 12.

Note that the pulse interval is a pause time during which no voltage (no pulse voltage) is applied to the electrode gap between the workpiece W and the wire electrode 12. The relative movement speed between the wire electrode 12 and the workpiece W is a speed at which the wire electrode 12 is moved relative to the workpiece W. The feed rate is a speed or rate at which the wire electrode 12 travels in the wire running direction.

The control unit 60 controls the main machine body 14 and the dielectric fluid unit 16 based on the machining program and machining conditions stored in the storage unit 58. The control unit 60 may be a processor such as a CPU (Central Processing Unit) and an MPU (Micro Processing Unit). The control unit 60 includes a power supply control unit 62, a first motor control unit 64, and a second motor control unit 66.

The power supply control unit 62 controls the power supply unit 50. The power supply control unit 62 causes the power supply unit 50 to apply voltage pulses having a voltage value (the pulse voltage stored in the storage unit 58) at a pulse interval (the pulse interval stored in the storage unit 58) to the electrode gap between the workpiece W and the wire electrode 12. Thus, a temporary voltage (pulse voltage) is repeatedly applied at a predetermined cycle to the electrode gap between the workpiece W and the wire electrode 12 through the power supply unit 50.

The first motor control unit 64 is a motor control unit that controls the first motor unit 54. The first motor control unit 64 controls the first motor unit 54 so as to realize movement along the machining path specified by the machining program at the relative movement speed stored in the storage unit 58. Specifically, the first motor control unit 64 performs feedback control on the X motor 54$x$ and the Y motor 54$y$, based on signals output from encoders provided in the X motor 54$x$ and the Y motor 54$y$ of the first motor unit 54. As a result, the wire electrode 12 is moved relative to the workpiece W in at least one of the X-axis direction and the Y-axis direction through the first motor unit 54.

The second motor control unit 66 is a motor control unit that controls the second motor unit 56, and has a first rate control mode (first feed rate control mode) and a second rate control mode (second feed rate control mode). The first rate control mode is the normal mode in which the second motor unit 56 is controlled so that the feed rate of the wire electrode 12 becomes a set feed rate. As described above, the set feed rate is a feed rate of the wire electrode 12 set by the operator's setting operation or a feed rate of the wire electrode 12 set as a default value in advance, and is stored in the storage unit 58.

In the first rate control mode, the second motor control unit 66 controls the second motor unit 56 so as to achieve the feed rate (set feed rate) of the wire electrode 12 stored in the storage unit 58. Specifically, the second motor control unit 66 performs feedback control on the torque motors 26, 42, based on the signals output from the encoders provided in the torque motors 26, 42 of the second motor unit 56. As a result, torques are applied to the wire bobbin 24 and the feed roller 40 through the torque motors 26 and 42, and the wire electrode 12 in contact with the wire bobbin 24 and the feed roller 40 is fed in the wire running direction at the set feed rate.

Figure 3:
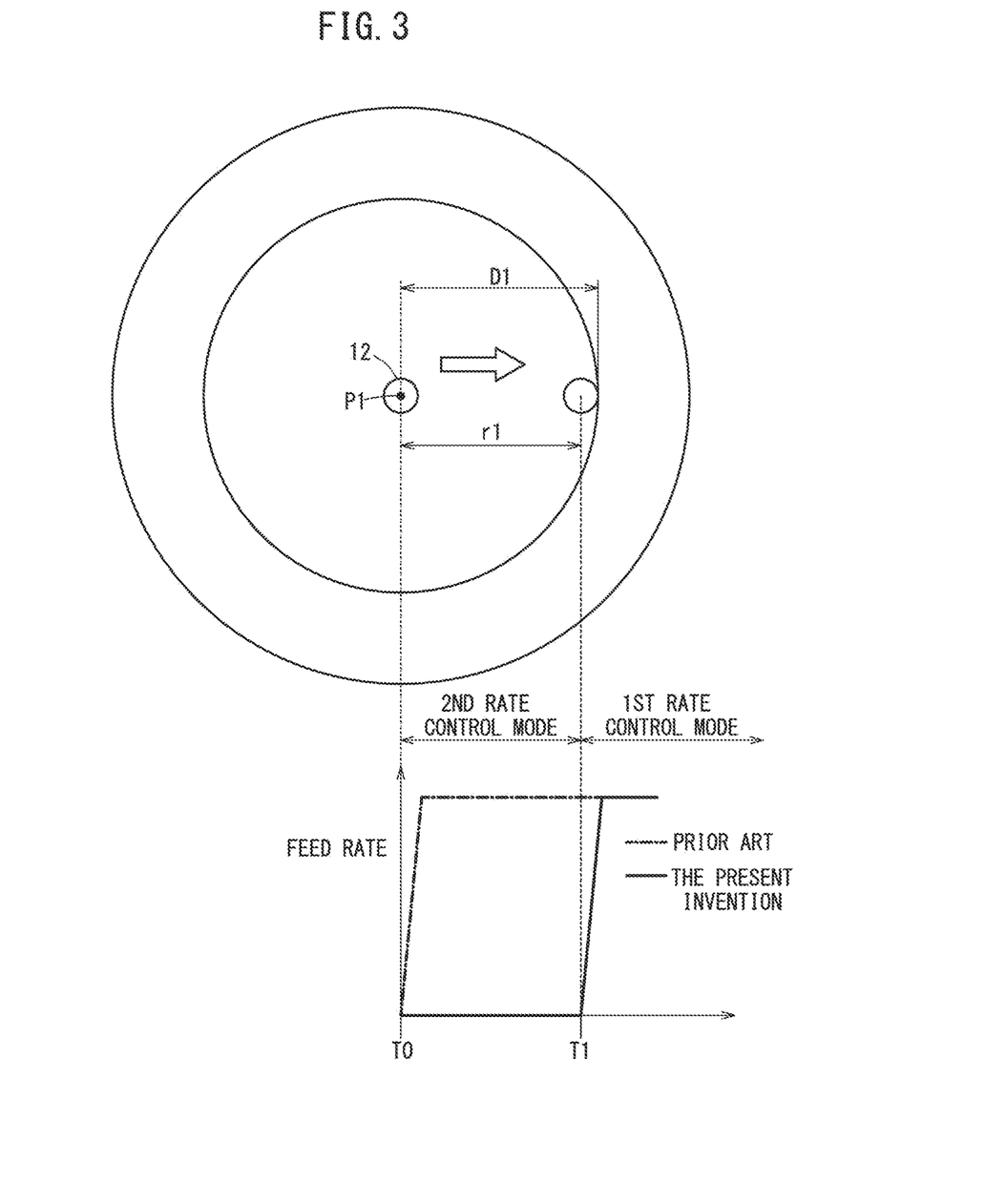
FIG. 3 is a diagram illustrating the change of the feed rate of the wire electrode from when machine processing is started.
Figure 4:
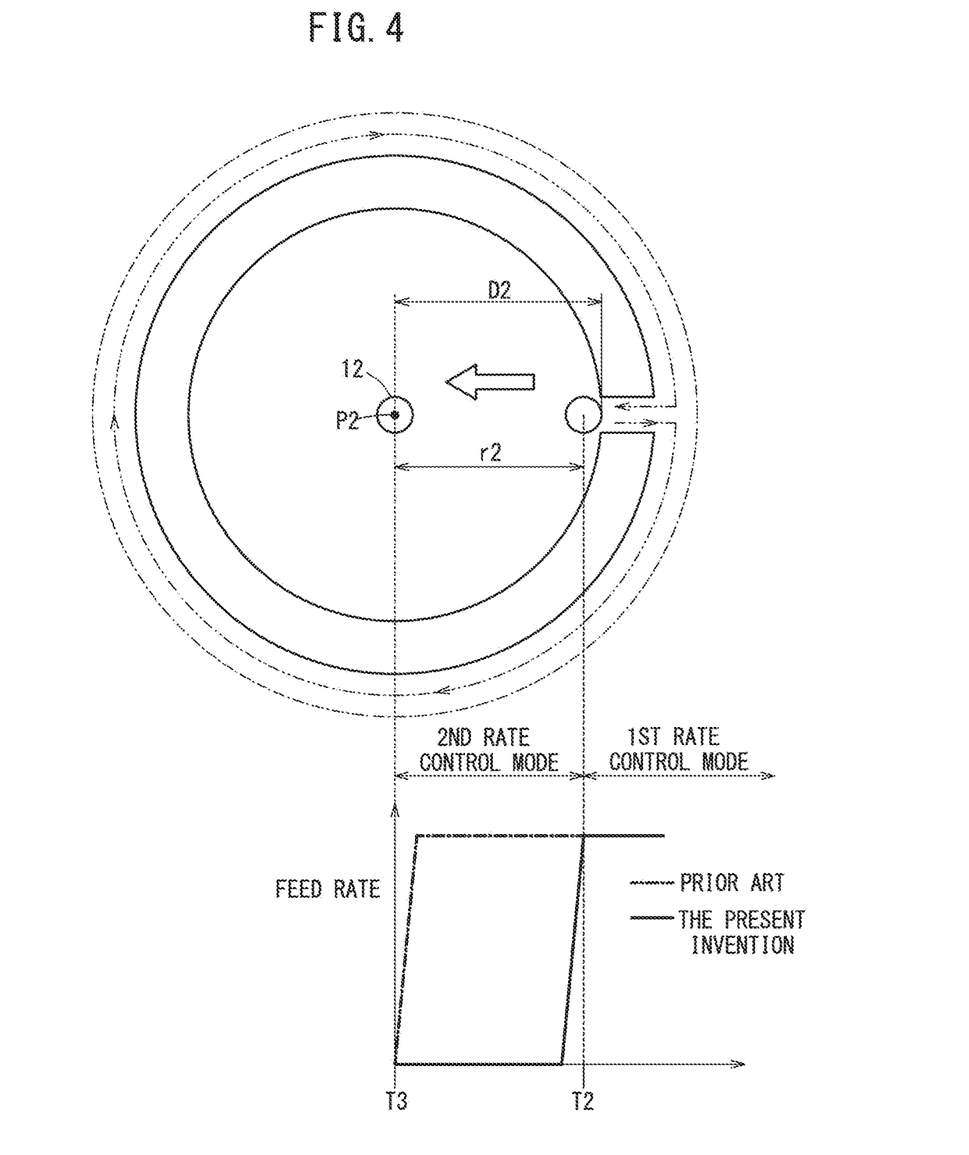
FIG. 4 is a diagram illustrating the change of the feed rate of the wire electrode until machine processing is ended.

Referring to FIGS. 3 and 4, the second rate control mode will be described. FIG. 3 shows the change of the feed rate of the wire electrode 12 when the wire electrode 12 is relatively moved from a processing start position P1 toward the workpiece W. FIG. 4 shows the change of the feed rate of the wire electrode 12 when the wire electrode 12 is relatively moved from the machining end of the workpiece W to a processing end position P2. FIGS. 3 and 4 show a case where the center of the circular tubular workpiece W viewed from the die guide 34 side (Z-axis direction side) is the processing start position P1 (FIG. 3) and the processing end position P2 (FIG. 4). In FIG. 4, the machining path on the workpiece W is shown by a two-dot chain line.

As shown in FIG. 3, the second motor control unit 66 implements the second rate control mode during a first non-machining period r1 from a processing start time point T0 to a first time point T1 at which the wire electrode 12 is estimated to enter the workpiece W. In the second rate control mode illustrated in FIG. 3, the second motor unit 56 is controlled so that the feed rate of the wire electrode 12 becomes zero. That is, in the example of FIG. 3, the second motor control unit 66 does not drive the second motor unit 56 during the first non-machining period r1. Note that the second motor control unit 66 may adjust the feed rate of the wire electrode 12 to any value other than zero as long as it controls the second motor unit 56 such that the feed rate of the wire electrode 12 is made slower than the set feed rate.

The first time point T1 is estimated based on the detection result from the voltage sensor 50A. That is, the second motor control unit 66, based on the voltage output from the voltage sensor 50A, calculates (determines) the average of the voltage applied to the electrode gap between the workpiece W and the wire electrode 12 per unit time. The second motor control unit 66 estimates, as the first time point T1, a point of time at which the calculated average voltage per unit time has changed from a state of being equal to or more than a predetermined threshold to a state of being less than the threshold.

On the other hand, as shown in FIG. 4, the second motor control unit 66 implements the second rate control mode, during a second non-machining period r2 from a second time point T2 when the wire electrode 12 is estimated to exit the workpiece W to a processing end time point T3. In the second rate control mode shown in FIG. 4, the second motor unit 56 is controlled so that the feed rate of the wire electrode 12 becomes zero. That is, in the example of FIG. 4, the second motor control unit 66 controls the second motor unit 56 such that the second motor unit 56 does not operate during the second non-machining period r2. Note that the second motor control unit 66 may adjust the feed rate of the wire electrode 12 to any value other than zero as long as it controls the second motor unit 56 such that the feed rate of the wire electrode 12 is made slower than the set feed rate.

The second time point T2 is estimated based on the detection result from the voltage sensor 50A. That is, the second motor control unit 66 estimates, as the second time point T2, a point of time at which the average voltage per unit time determined based on the output voltage from the voltage sensor 50A has changed from a state of being less than a predetermined threshold to a state of being equal to or more than the threshold.

As described above, the second motor control unit 66 controls the second motor unit 56 so that the feed rate of the wire electrode 12 becomes slower than the set feed rate during the first non-machining period r1 (FIG. 3) and the second non-machining period r2 (FIG. 4). Thus, the feed amount of the wire electrode 12 that is not used for machining the workpiece W is reduced. As a result, not only waste of the wire electrode 12 but also waste of the load of the second motor unit 56 to feed the wire electrode 12 can be reduced, resultantly making it possible to achieve efficient machining.

Note that the second motor control unit 66 implements the first rate control mode as described above during the machining period from the first time point T1 to the second time point T2.

Figure 5:
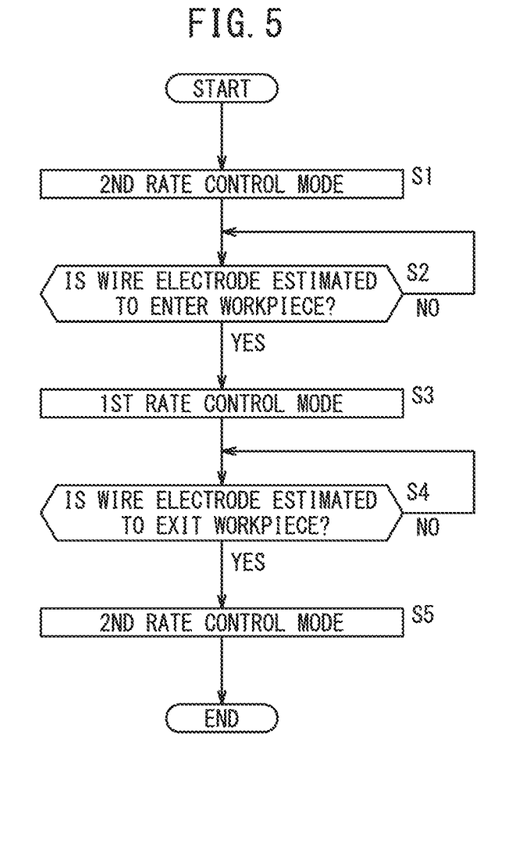
FIG. 5 is a flowchart showing procedure steps of controlling process of a second motor control unit.

Next, regarding the control method of the wire electrical discharge machine 10, the control process of the second motor control unit 66 will be described with reference to FIG. 5.

When the wire electrode 12 is automatically fed at the processing start position P1 and a relative movement of the wire electrode 12 with respect to the workpiece W is started from the processing start position P1 where the auto wire feeding has been performed, the control process proceeds to step S1.

At step S1, the second motor control unit 66 starts implementing the second rate control mode for controlling the second motor unit 56 so that the feed rate of the wire electrode 12 becomes lower than the set feed rate. As a result, the wire electrode 12 is fed in the wire running direction at a feed rate lower than the set feed rate, or comes to rest without being fed in the wire running direction. In addition, the second motor control unit 66 starts monitoring the average of the voltage per unit time applied to the electrode gap between the workpiece W and the wire electrode 12 based on the voltage output from the voltage sensor 50A. The average voltage per unit time immediately after the start of machine processing is greater than the threshold value set for the average voltage. When the second rate control mode and the monitoring of the average voltage per unit time are started, the control process proceeds to step S2.

At step S2, the second motor control unit 66 determines whether or not the first time point T1 has been reached at which the wire electrode 12 enters the workpiece W. Here, when the average voltage per unit time is equal to or more than the predetermined threshold, the second motor control unit 66 determines that the first time point T1 has not yet come. On the other hand, when the average voltage per unit time has changed from the state of being equal to or more than the predetermined threshold to the state of being less than the threshold, the second motor control unit 66 determines that the first time point T1 has been reached. At this time, the control process proceeds to step S3.

At step S3, the second motor control unit 66 transitions from the second rate control mode to the first rate control mode and starts controlling the second motor unit 56 so that the feed rate of the wire electrode 12 becomes the set feed rate. As a result, the wire electrode 12 is fed in the wire running direction at the set feed rate. The second motor control unit 66 continues to monitor the average of the voltage per unit time applied to the electrode gap between the workpiece W and the wire electrode 12. During the machining period in which the electrical discharge is generated at the electrode gap between the workpiece W and the wire electrode 12, the average voltage per unit time remains lower than the threshold. When the first rate control mode is started, the control process proceeds to step S4.

At step S4, the second motor control unit 66 determines whether or not the second time point T2 has been reached at which the wire electrode 12 exits the workpiece W. Here, when the average voltage per unit time is lower than the predetermined threshold, the second motor control unit 66 determines that the second time point T2 has not yet come. On the other hand, when the average voltage per unit time has changed from the state of being lower than the predetermined threshold to the state of being equal to or more than the threshold, the second motor control unit 66 determines that the second time point T2 has been reached. At this time, the control process proceeds to step S5.

At step S5, the second motor control unit 66 transitions from the first rate control mode to the second rate control mode and starts controlling the second motor unit 56 so that the feed rate of the wire electrode 12 becomes lower than the set feed rate. As a result, the wire electrode 12 is fed in the wire running direction at a feed rate lower than the set feed rate, or comes to rest without being fed in the wire running direction. When the wire electrode 12 moving relative to the workpiece W reaches the processing end position P2, the relative movement of the wire electrode 12 stops, and the control process is ended.

[Modifications]

The above embodiment may be modified as follows.

(Modification 1)

Figure 6:
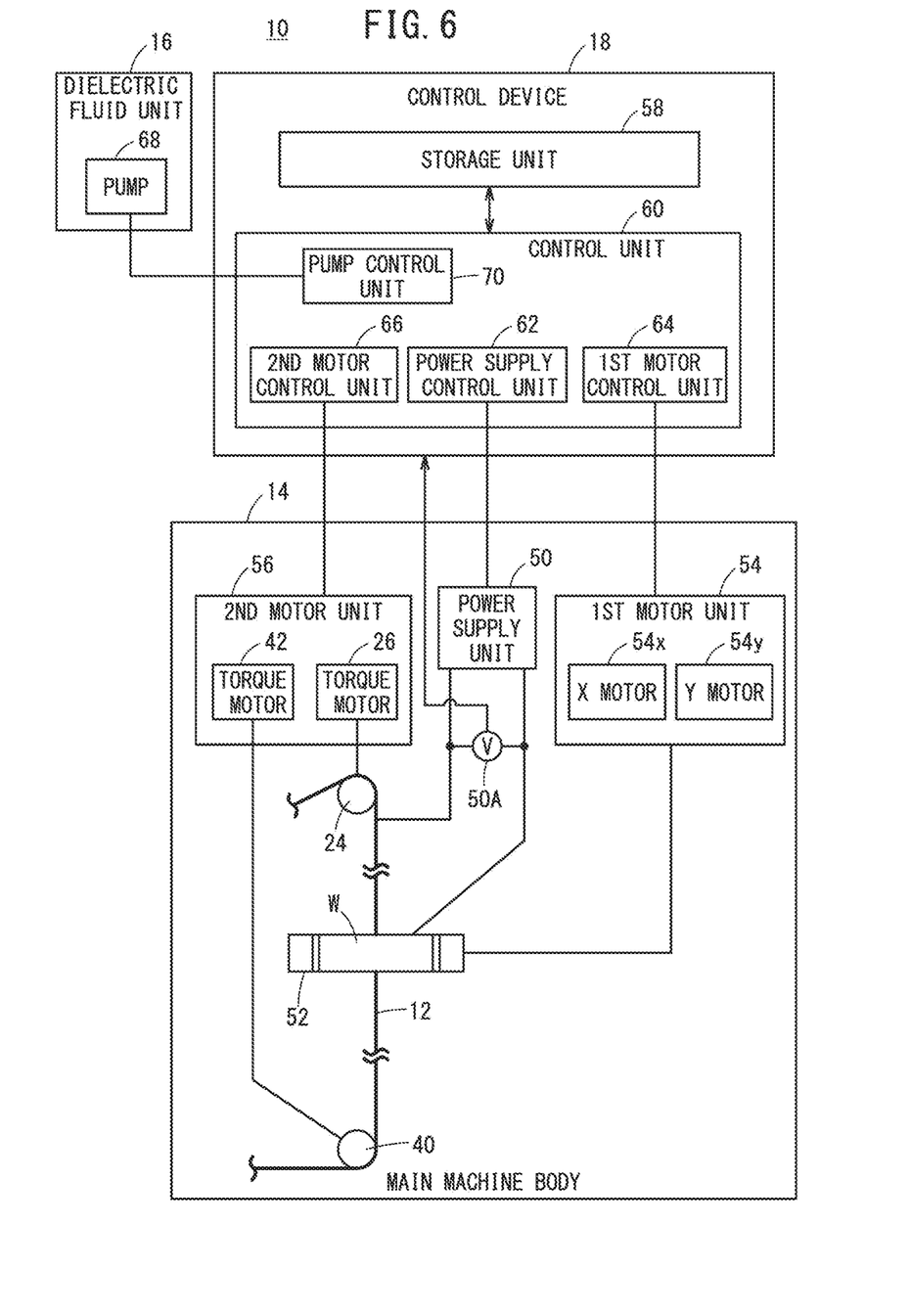
FIG. 6 is a schematic diagram showing a configuration of a machining control system of a modification 1.

Referring to FIG. 6, a wire electrical discharge machine 10 of a modification 1 will be described. In FIG. 6, the same reference numerals are allotted to the same components as those described in the above embodiment. In this modification, the description overlapping with the above embodiment will be omitted.

The dielectric fluid unit 16 includes a pump 68, and the control unit 60 in the control device 18 has a pump control unit 70. The pump 68 is a pump that sends a dielectric working fluid, which is a liquid ejected from at least the die guide 34 toward the electrode gap between the workpiece W and the wire electrode 12.

The pump control unit 70 implements a first flow rate control mode in which the pump 68 is controlled so that the flow rate of the working fluid becomes a set rate during the machining period. The set rate is the flow rate of the working fluid set according to the setting operation of the operator, or the flow rate of the working fluid set as a default in advance, and is stored in the storage unit 58. As described above, the machining period is a period of time from the first time point T1 at which the wire electrode 12 moving relative to the workpiece W in the direction intersecting the wire running direction is estimated to enter the workpiece W, to the second time point T2 at which the wire electrode 12 is estimated to exit the workpiece W.

The first time point T1 and the second time point T2 is estimated by the pump control unit 70 based on the detection result from the voltage sensor 50A, as in the above embodiment. That is, the pump control unit 70 estimates, as the first time point T1, the time point at which the average voltage per unit time has changed from the state of being equal to or more than the predetermined threshold to the state of being less than the threshold, and estimates, as the second time point T2, the time point at which the average voltage per unit time has changed from the state of being lower than the threshold to the state of being equal to or more than the threshold value.

On the other hand, the pump control unit 70 implements a second flow rate control mode in which the pump 68 is controlled so that the flow rate of the working fluid becomes lower than the set rate during the first non-machining period r1 and the second non-machining period r2. As a result, it is possible to reduce the liquid being ejected toward the electrode gap between the workpiece W and the wire electrode 12 during the non-machining period in which no sludge is generated. Thus, waste of the load of the pump 68 to send the liquid is reduced, and resultantly, efficient machining can be performed.

(Modification 2)

The first time point T1 and the second time point T2 are estimated based on the average of the voltage applied to the electrode gap between the workpiece W and the wire electrode 12 per unit time, but parameters other than the average voltage may be used for the estimation. For example, in some case, the machining program may specify the processing start position P1 and a distance D1 (FIG. 3) between the processing start position P1 and the end face of the workpiece W to be machined first. In this case, the second motor control unit 66 can calculate the first time point T1 based on the distance D1 designated by the machining program and the relative movement speed of the wire electrode 12 stored in the storage unit 58. As a result, the first time point T1 can be estimated without using a sensor such as the voltage sensor 50A to capture the relative movement of the wire electrode 12 with respect to the workpiece W.

Further, for example, in some cases, the machining program may specify a distance D2 (FIG. 4) between the end face of the workpiece W when the wire electrode 12 exits the workpiece W after completion of machining the workpiece W and the processing end position P2. In this case, the second motor control unit 66 can calculate the second time point T2 based on the distance D2 designated by the machining program and the relative movement speed of the wire electrode 12 stored in the storage unit 58. As a result, the second time point T2 can be estimated without using a sensor such as the voltage sensor 50A to capture the relative movement of the wire electrode 12 with respect to the workpiece W.

Further, for example, there may be a case where a liquid pressure sensor for detecting the liquid pressure of the working fluid ejected toward the electrode gap between the workpiece W and the wire electrode 12 is provided. In this case, the second motor control unit 66 may estimate, as the first time point T1, the time point at which the liquid pressure detected by the liquid pressure sensor has changed from a state of being equal to or more than a predetermined liquid pressure threshold to a state of being less than the liquid pressure threshold. Also, the second motor control unit 66 may estimate, as the second time point T2, the time point at which the liquid pressure detected by the liquid pressure sensor has changed from the state of being less than the threshold to the state of being equal to or more than the threshold. The liquid pressure detected by the liquid pressure sensor tends to be clearly different between when the wire electrode 12 is located inside the workpiece W and when it is located outside the workpiece W. Therefore, it is easy to accurately estimate a time point at which the wire electrode 12 actually enters the workpiece W and a time point at which it actually exits the workpiece W. It should be noted that, in the case of the modification 1, the first time point T1 and the second time point T2 cannot be estimated using the liquid pressure sensor.

(Modification 3)

Though in the above embodiment each of the feed rates of the wire electrode 12 during the first non-machining period r1 and the second non-machining period r2 is constant at a feed rate slower than the set feed rate, they may be variable. That is, in the first non-machining period r1, the second motor control unit 66 may control the second motor unit 56 so as to increase the feed rate of the wire electrode 12 as the wire electrode approaches closer to the first time point T1 (i.e., depending on the degree of approaching the first time point T1). In other words, in the first non-machining period r1, the second motor control unit 66 controls the second motor unit 56 so that the feed rate of the wire electrode 12 approaches the set feed rate as the wire electrode approaches closer to the first time point T1.

On the other hand, in the second non-machining period r2, the second motor control unit 66 may control the second motor unit 56 so as to lower the feed rate of the wire electrode 12 as the wire electrode moves more apart from the second time point T2 (i.e., depending on the degree of being apart from the second time point T2). In other words, the second motor control unit 66 controls the second motor unit 56 such that the feed rate of the wire electrode 12 deviates (decreases) from the set feed rate as the wire electrode moves more apart from the second time point T2.

By thus varying the feed rate of the wire electrode 12 during the first non-machining period r1 and the second non-machining period r2, it is possible to avoid a sudden stop of the feeding operation of the wire electrode 12. In addition, the liquid flow rate during the first non-machining period r1 and the second non-machining period r2 of the modification 1 may be varied.

(Modification 4)

Although the second rate control mode is implemented in both the first non-machining period r1 and the second non-machining period r2 in the above-described embodiment, the mode is implemented only in one of the first non-machining period r1 and the second non-machining period r2. Also, the second flow rate control mode of the modification 1 may be implemented only in one of the first non-machining period r1 and the second non-machining period r2.

(Modification 5)

The above-described embodiment and modifications may be arbitrarily combined as long as no technical inconsistency occurs.

[Invention Obtained from the Embodiment and Modifications]

The inventions that can be understood from the above-described embodiment and modifications are described below.

(First Invention)

The first invention is the wire electrical discharge machine (10) for machining a workpiece (W) by applying voltage to an electrode gap formed between the workpiece (W) and a wire electrode (12) to generate electrical discharge, the wire electrical discharge machine including:

a motor (a motor unit) (56) configured to feed the wire electrode (12) in a wire running direction in which the wire electrode (12) extends; and, a motor control unit (66) configured to control the motor (56).

The motor control unit (66) is configured to, control the motor (56) so as to feed the wire electrode (12) at a set feed rate during a machining period from a first time point (T1) at which the wire electrode (12) moving relative to the workpiece (W) in the direction intersecting the wire running direction is estimated to enter the workpiece (W), to a second time point (T2) at which the wire electrode (12) is estimated to exit the workpiece (W), and control the motor (56) so as to feed the wire electrode (12) at a feed rate lower than the set feed rate during at least one of a first non-machining period (r1) from a processing start time point (T0) to the first time point (T1) and a second non-machining period (r2) from the second time point (T2) to a processing end time point (T3).

With the above configuration, the feed amount of the wire electrode (12) in the non-machining period is reduced, so that it is possible to reduce waste of the wire electrode (12), the load of the motor unit (56) for feeding the wire electrode (12), and the like, and resultantly achieve efficient machining.

The wire electrical discharge machine (10) may further include: a pump (68) configured to send a liquid to be ejected toward the electrode gap; and a pump control unit (70) configured to control the pump (68), and the pump control unit (70) may be configured to control the pump (68) so as to send the liquid at a set flow rate during the machining period, and control the pump (68) so as to send the liquid at a flow rate lower than the set flow rate during at least one of the first non-machining period (r1) and the second non-machining period (r2). As a result, it is possible to reduce the liquid being ejected toward the electrode gap between the workpiece (W) and the wire electrode (12) during the non-machining period when no sludge is generated. Therefore, it is possible to reduce waste of the load of the pump (68) for sending the liquid, and resultantly achieve efficient machining.

The first time point (T1) may be a point of time at which the average of the voltage applied to the electrode gap per unit time has changed from a state where the average voltage is equal to or more than the predetermined threshold to a state where the average voltage is less than the predetermined threshold, and the second time point (T2) may be a point of time at which the average voltage has changed from the state where the average voltage is less than the predetermined threshold to the state where the average voltage is equal to or more than the predetermined threshold. The average voltage applied per unit time tends to be clearly different between when the wire electrode (12) is located inside the workpiece (W) and when it is located outside the workpiece. Therefore, it is easy to accurately estimate the time point at which the wire electrode (12) actually enters the workpiece (W) and the time point at which it exits the workpiece (W).

The first time point (T1) may be calculated based on the relative movement speed of the wire electrode (12) and a distance (D1) from a processing start position (P1) to the end face of the workpiece (W), designated by a machining program, and the second time point (T2) may be calculated based on the relative movement speed of the wire electrode (12) and a distance (D2) from the end face of the workpiece (W) to a processing end position (P2), designated by the machining program. As a result, the first time point (T1) and the second time point (T2) can be estimated without using a sensor or the like to capture the relative movement of the wire electrode (12) with respect to the workpiece (W).

The motor control unit (66) may be configured to change the feed rate of the wire electrode (12) depending on at least one of the degree of approaching the first time point (T1) in the first non-machining period (r1), and the degree of being apart from the second time point (T2) in the second non-machining period (r2). With this configuration, it is possible to avoid a sudden stop of the feeding operation of the wire electrode (12).

(Second Invention)

The second invention is a control method of a wire electrical discharge machine (10) that machines a workpiece (W) by applying voltage to an electrode gap formed between the workpiece (W) and a wire electrode (12) to generate electrical discharge, the control method including:

a first control step (S3) of controlling a motor (a motor unit) (56) configured to feed the wire electrode (12) in a wire running direction in which the wire electrode (12) extends, so as to feed the wire electrode (12) at a set feed rate during a machining period from a first time point (T1) at which the wire electrode (12) moving relative to the workpiece (W) in the direction intersecting the wire running direction is estimated to enter the workpiece (W), to a second time point (T2) at which the wire electrode (12) is estimated to exit the workpiece (W); and, a second control step (S1, S5) of controlling the motor (56) so as to feed the wire electrode (12) at a feed rate lower than the set feed rate during at least one of a first non-machining period (r1) from a processing start time point (T0) to the first time point (T1) and a second non-machining period (r2) from the second time point (T2) to a processing end time point (T3).

With the above configuration, the feed amount of the wire electrode (12) in the non-machining period is reduced, so that it is possible to reduce waste of the wire electrode (12), the load of the motor unit (56) for feeding the wire electrode (12), and the like, and resultantly achieve efficient machining.

The first control step (S3) may control a pump (68) configured to send a liquid to be ejected toward the electrode gap, so as to send the liquid at a set flow rate during the machining period, and the second control step (S1, S5) may control the pump (68) so as to send the liquid at a flow rate lower than the set flow rate during at least one of the first non-machining period (r1) and the second non-machining period (r2). As a result, it is possible to reduce the liquid being ejected toward the electrode gap between the workpiece (W) and the wire electrode (12) during the non-machining period when no sludge is generated. Therefore, it is possible to reduce waste of the load of the pump (68) to send the liquid, and resultantly achieve efficient machining.

The first time point (T1) may be a point of time at which the average of the voltage applied to the electrode gap per unit time has changed from a state where the average voltage is equal to or more than the predetermined threshold to a state where the average voltage is less than the predetermined threshold, and the second time point (T2) may be a point of time at which the average voltage has changed from the state where the average voltage is less than the predetermined threshold to the state that the average voltage is equal to or more than the predetermined threshold. The average voltage applied per unit time tends to be clearly different between when the wire electrode (12) is located inside the workpiece (W) and when it is located outside the workpiece. Therefore, it is easy to accurately grasp the time point at which the wire electrode (12) actually enters the workpiece (W) and the time point at which it exits the workpiece (W).

The first time point (T1) may be calculated based on the relative movement speed of the wire electrode (12) and a distance (D1) from a processing start position (P1) to the end face of the workpiece (W), designated by a machining program, and the second time point (T2) may be calculated based on the relative movement speed of the wire electrode (12) and a distance (D2) from the end face of the workpiece (W) to a processing end position (P2), designated by the machining program. As a result, the first time point (T1) and the second time point (T2) can be estimated without using a sensor or the like to capture the relative movement of the wire electrode (12) with respect to the workpiece (W).

The second control step (S1, S5) may change the feed rate of the wire electrode (12) depending on at least one of the degree of approaching the first time point (T1) in the first non-machining period (r1), and the degree of being apart from the second time point (T2) in the second non-machining period (r2). With this configuration, it is possible to avoid a sudden stop of the feeding operation of the wire electrode (12).

The present invention is not particularly limited to the embodiment described above, and various modifications are possible without departing from the essence and gist of the present invention.

What is claimed is:

1. A wire electrical discharge machine for machining a workpiece by applying voltage to an electrode gap formed between the workpiece and a wire electrode to generate electrical discharge, comprising:
   a motor configured to feed the wire electrode in a wire running direction in which the wire electrode extends;
   a processor; and
   a memory having stored therein instructions, which when executed by the processor cause the wire electrical discharge machine to:
   control the motor so as to feed the wire electrode at a set feed rate during a machining period from a first time point at which the wire electrode moving relative to the workpiece in a direction intersecting the wire running direction is estimated to enter the workpiece, to a second time point at which the wire electrode is estimated to exit the workpiece; and
   control the motor so as to feed the wire electrode at a feed rate lower than the set feed rate during at least one of a first non-machining period from a processing start time point to the first time point and a second non-machining period from the second time point to a processing end time point.

2. The wire electrical discharge machine according to claim 1, further comprising a pump configured to send a liquid to be ejected toward the electrode gap, the processor being configured to:
   control the pump so as to send the liquid at a set flow rate during the machining period; and
   control the pump so as to send the liquid at a flow rate lower than the set flow rate during at least one of the first non-machining period and the second non-machining period.

3. The wire electrical discharge machine according to claim 1, wherein:
   the first time point is a point of time at which an average of the voltage applied to the electrode gap per unit time has changed from a state that the average of the voltage is equal to or more than a predetermined threshold to a state that the average of the voltage is less than the predetermined threshold, and the second time point is a point of time at which the average of the voltage has changed from the state that the average of the voltage is less than the predetermined threshold to the state that the average of the voltage is equal to or more than the predetermined threshold.

4. The wire electrical discharge machine according to claim 1, wherein the first time point is calculated based on a relative movement speed of the wire electrode and a distance from a processing start position to an end face of the workpiece, and the second time point is calculated based on the relative movement speed of the wire electrode and a distance from the end face of the workpiece to a processing end position.

5. The wire electrical discharge machine according to claim 1, wherein the processor is further configured to change the feed rate of the wire electrode depending on at least one of a degree of approaching the first time point in the first non-machining period, and a degree of being apart from the second time point in the second non-machining period.

6. A control method of a wire electrical discharge machine that machines a workpiece by applying voltage to an electrode gap formed between the workpiece and a wire electrode to generate electrical discharge, comprising:
   controlling a motor configured to feed the wire electrode in a wire running direction in which the wire electrode extends, so as to feed the wire electrode at a set feed rate during a machining period from a first time point at which the wire electrode moving relative to the workpiece in a direction intersecting the wire running direction is estimated to enter the workpiece, to a second time point at which the wire electrode is estimated to exit the workpiece; and
   controlling the motor so as to feed the wire electrode at a feed rate lower than the set feed rate during at least one of a first non-machining period from a processing start time point to the first time point and a second non-machining period from the second time point to a processing end time point.

7. The control method according to claim 6, further comprising:
   controlling a pump configured to send a liquid to be ejected toward the electrode gap, so as to send the liquid at a set flow rate during the machining period; and
   controlling the pump so as to send the liquid at a flow rate lower than the set flow rate during at least one of the first non-machining period and the second non-machining period.

8. The control method according to claim 6, wherein the first time point is a point of time at which an average of the voltage applied to the electrode gap per unit time has changed from a state that the average of the voltage is equal to or more than a predetermined threshold to a state that the average of the voltage is less than the predetermined threshold, and the second time point is a point of time at which the average of the voltage has changed from the state that the average of the voltage is less than the predetermined threshold to the state that the average of the voltage is equal to or more than the predetermined threshold.

9. The control method according to claim 6, wherein the first time point is calculated based on a relative movement speed of the wire electrode and a distance from a processing start position to an end face of the workpiece, designated by a machining program, and the second time point is calculated based on the relative movement speed of the wire electrode and a distance from the end face of the workpiece to a processing end position, designated by the machining program.

10. The control method according to claim 6, wherein the feed rate of the wire electrode is changed depending on at least one of a degree of approaching the first time point in the first non-machining period, and a degree of being apart from the second time point in the second non-machining period.

* * * * *